(12) United States Patent
Sorkin

(10) Patent No.: US 9,709,208 B2
(45) Date of Patent: Jul. 18, 2017

(54) PIPELINE SUPPORTING APPARATUS

(71) Applicant: Felix L. Sorkin, Stafford, TX (US)

(72) Inventor: Felix L. Sorkin, Stafford, TX (US)

( * ) Notice: Subject to any disclaimer, the term of this patent is extended or adjusted under 35 U.S.C. 154(b) by 0 days.

(21) Appl. No.: 14/656,191

(22) Filed: Mar. 12, 2015

(65) Prior Publication Data

US 2016/0265690 A1 Sep. 15, 2016

(51) Int. Cl.
*F16L 1/028* (2006.01)
*F16L 3/02* (2006.01)
*F16M 11/00* (2006.01)
*F16L 1/036* (2006.01)
*F16L 1/06* (2006.01)
*E03F 3/06* (2006.01)

(52) U.S. Cl.
CPC .............. *F16M 11/00* (2013.01); *F16L 1/036* (2013.01); *F16L 1/06* (2013.01); *E03F 3/06* (2013.01)

(58) Field of Classification Search
CPC ...... F16L 3/1033; F16L 3/1041; F16L 3/1218
USPC ....................................................... 405/184.4
See application file for complete search history.

(56) References Cited

U.S. PATENT DOCUMENTS

| 3,330,517 | A | * | 7/1967 | Zimmermann | A47F 5/103 248/62 |
| 4,044,428 | A | * | 8/1977 | Kowalski | F16L 3/24 24/16 R |
| 4,046,344 | A | * | 9/1977 | Scanlan | F16L 3/24 248/72 |
| 4,063,429 | A | | 12/1977 | Wilson | |
| 4,068,488 | A | | 1/1978 | Ball | |
| 4,090,686 | A | | 5/1978 | Yarbrough | |
| 4,185,802 | A | * | 1/1980 | Myles | F16L 55/035 248/68.1 |
| 4,197,033 | A | | 4/1980 | Gendron | |
| 4,858,861 | A | * | 8/1989 | Wilkinson, III | F16L 3/1033 24/514 |
| 6,250,847 | B1 | | 6/2001 | Bingham | |
| 6,336,770 | B1 | | 1/2002 | Evans | |
| 6,413,018 | B1 | | 7/2002 | Klaymar | |
| 7,074,305 | B2 | | 7/2006 | Connors | |
| 8,091,839 | B2 | * | 1/2012 | Whipple | F16L 3/04 24/279 |

* cited by examiner

*Primary Examiner* — Tara M. Pinnock
(74) *Attorney, Agent, or Firm* — Egbert Law Offices, PLLC

(57) ABSTRACT

A support apparatus for installing a pipeline into a trench has a first pipeline-receiving section, a second pipeline-receiving section, and a fastener removably affixed to at least one of the first and second pipeline receiving sections. The fastener is connected to the first and second pipeline-receiving sections so as to be in a pipeline-supporting position. The fastener is removable from at least one of the first and second pipeline-receiving sections so as to allow the first and second pipeline-receiving sections to separate from each other. Each of the pipeline-receiving sections includes a pipeline-receiving surface and a support affixed to the pipeline-receiving surface and extending downwardly therefrom so as to allow the pipeline-receiving surface to be positioned at a desired location above a bottom of the trench.

8 Claims, 3 Drawing Sheets

US 9,709,208 B2

PIPELINE SUPPORTING APPARATUS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the installation and formation of pipelines into the earth. More particularly, the present invention relates to apparatus for the support of pipelines within a trench. Additionally, the present invention relates to apparatus wherein the pipeline can be installed and welded within the trench and whereby the pipeline can be lowered into the trench in a convenient and safe manner.

2. Description of Related Art Including Information Disclosed Under 37 CFR 1.97 and 37 CFR 1.98

Pipelines are used to transport fluids, typically oil, gas and other petroleum products, across long distances. In the current art of installing new pipelines, the pipe is lowered into trench and laid on top of support benches, which are spaced along the length of the trench floor. The trench containing the newly-laid pipe is then backfilled normally in two stages. A layer of uniform, rock-free subsoil is introduced into the trench so that it flows around and beneath the pipe between the spaced support benches, fills up the open area between the sides of the pipe and the trench walls, and covers the pipe to a specified height over the pipe.

In the past, a variety of lifting apparatus have been utilized so as to place each of the pipes of the pipeline into the trench. Conventionally, this requires that heavy equipment be moved to the pipeline trench location so as to carry out the requisite work. The attachment of the heavy equipment, such as cranes, to the pipe of the pipeline can be a complex and time-consuming procedure. Additionally, the attachment of the cables to the pipeline can be somewhat dangerous to the person performing the connection. The pipes are extremely heavy and, if not properly attached, can be released in a dangerous manner. After the pipeline is placed within the trench, it is necessary to release the cable from the pipeline so as to allow the pipeline to remain within the trench.

Typically, during the installation of pipelines, it is necessary to weld one pipe to another pipe. This welding activity is carried out adjacent to the trench and on the surface of the earth at the trench. In order to properly weld the pipeline, a suitable rotation mechanism must be placed on the pipeline so as to allow the pipeline to be properly rotated during welding. In other circumstances, the welder must carry out a difficult and cumbersome task of utilizing the welding equipment in a manner so as to extend circumferentially around the pipe in the location between the pipeline sections. Additionally, machining is necessary on the pipes of the pipeline so as to allow a proper weld to be achieved. After the welding is completed, the heavy equipment is then required to install the welded pipeline within the trench. Once again, this is difficult, time-consuming, and potentially dangerous. A need has developed whereby the pipeline can be properly welded while supported within the trench and whereby the welded pipeline can then be easily released into the trench without the need for heavy equipment.

In the past, various patents have issued relating to the installation of pipeline into trenches. For example, U.S. Pat. No. 4,063,429, issued on Dec. 20, 1977 to E. I. Wilson, shows a pipeline retard, support and protection method wherein a fast-setting expandable foam is placed in a trench at spaced locations below and around a pipeline to increase spaced retards and support pads in situ. Each retard and/or support pad is created in the absence of forms or other foam molding means for the expanding foam. The retards may be keyed to the trench walls and base for securement.

U.S. Pat. No. 4,068,488, issued on Jan. 17, 1978 to D. G. Ball, discloses a method of backfilling pipeline trenches. The trench is backfilled by temporarily supporting the pipeline at grade in the trench on deflatable airbags spaced along the bottom of the trench. The trench is then backfilled below and around the pipe by pneumatically blowing a granular fill material into the trench first beneath the pipe and then progressively upwardly about its opposite sides to about its spring line so as to simultaneously backfill the trench and uniformly compact the fill material about the pipe without leaving any voids. The fill material is blown into the trench through a pair of opposed air ducts with upturned lower outlet ends extending into the trench on opposite sides of the pipe so that backfilling progresses upwardly on opposite sides of the pipe simultaneously. As the backfilling operation progresses along the trench and approaches each support pad, the pad is deflated and removed so that the operation can proceed uninterruptedly.

U.S. Pat. No. 4,090,686, issued on May 23, 1978 to T. G. Yarbrough, shows a pipe-laying apparatus for supporting pipe elements in an excavation during the positioning of the pipe therein and prior to the filling in of the excavation with particulate material. The device consists of an upright two-legged frame and movable pipe-supporting slides that provide for easy removal of the device from the excavation after it has supported and maintained the alignment of the pipe-like elements during the pipe-laying operation.

U.S. Pat. No. 4,197,033, issued on Apr. 8, 1980 to G. J. Gendron, shows a method of installing a pipeline by forming a ground surface below the desired grade of the pipeline, holding a pipe length at the desired grade while injecting a hardenable fluid material into a bag positioned between the pipe length and the underlying ground surface so that after the material hardens, the bag provides a temporary support for the pipe length at the proper grade. A permanent support is installed by placing hard granular material between the remainder of the underside of the pipe length and the underlying ground surface.

U.S. Pat. No. 6,250,847, issued on Jun. 26, 2001 to T. R. Bingham, provides a pipe support apparatus that includes a sleeve for being positioned along a length of a stake to be inserted into a ground surface of a trench. A sleeve projection extends outwardly from an outer surface of the sleeve. A hook extends partially about the pipeline so as to cradle a pipe. The hook operatively has an upper end and a lower end. The hook is pivotally coupled to the sleeve projection at its upper end for movement generally along a vertical plane from a lowered or engaged position to a raised or disengaged position. A handle is coupled to the hook and operatively extends upwardly therefrom for grasping and moving the hook between its engaged and disengaged positions.

U.S. Pat. No. 6,336,770, issued on Jan. 8, 2002 to K. T. Evans, discloses a pipe installation device that has opposing elongate anchor members having inside edges tapering away from a clamping end for sliding the pipe between the anchor members when the pipe is being positioned on the grade surface prior to supporting above the surface. The elongate anchor members penetrate a grade surface for holding the device upright while a clamp is secured to the rib for holding the pipe above the grade surface. The clamp is attached to the anchor member upper portion and holds the rib between clamp jaws. With the rib positioned upward and away from the pipe surface, the support devices holding the pipe are removed after the aggregate is placed within the trench and around the pipe. They are removed without displacing the pipe.

U.S. Pat. No. 6,413,018, issued on Jul. 2, 2002 to E. J. Klaymar, provides a method for supporting pipeline in a trench. The involves supporting the pipeline on specially-designed support benches at spaced intervals. The benches are designed to fail when exposed to a predetermined load. The load is placed on the benches at some point during the backfilling of the trench or when the pipeline undergoes hydrostatic testing. When the benches fail, the fill under the pipeline is compacted and thereby supports the pipeline in lieu of the support benches.

U.S. Pat. No. 7,074,305, issued on Jul. 11, 2006 to G. W. Connors, provides a pipeline support for reducing corrosion on a pipeline surface. This pipeline support comprises support fill material and a case for housing the support fill material.

It is an object of the present invention to provide a pipeline support apparatus that effectively supports a pipeline within a trench.

It is an object of the present invention to provide a pipeline support apparatus that allows welding and machining operations to carried out on the pipeline while the pipeline is in the trench.

It is another object of the present invention to provide a pipeline support apparatus that allows the pipeline to be lowered toward the bottom of the trench in a safe, convenient and efficient manner.

It is still another object of the present invention to provide a pipeline support apparatus which avoids the use of cranes and other equipment for the purpose of lowering the pipeline to the bottom of the trench.

It is still a further object of the present invention to provide a pipeline support apparatus that easy to use, easy to manufacture and relatively inexpensive.

These and other objects and advantages of the present invention will become apparent from a reading of the attached specification and appended claims.

BRIEF SUMMARY OF THE INVENTION

The present invention is a pipeline support apparatus that comprises a first pipeline-receiving section, a second pipeline-receiving section, and a fastener that is removably affixed to the first and second pipeline-receiving sections. The fastener allows the pipeline-receiving sections to be maintained in a pipeline supporting position and allows the pipeline-receiving sections to be separated for the purposes of allowing the pipeline to be lowered into the trench.

The first pipeline-receiving section has a surface suitable for receiving a pipe therein. This surface is curved. The curvature of the surface will have a radius generally matching a radius of the pipe. A support is affixed to the surface and extends downwardly therefrom. The support allows the pipeline-receiving surface to be positioned at a desired location above a bottom of the trench. The pipeline-receiving surface has a curvature of no more than 90°.

The second pipeline-receiving section also has a surface for receiving a pipe of the pipeline therein. The pipeline-receiving section has a support that is affixed to the pipeline-receiving surface and extends downwardly therefrom. The second pipeline-receiving section serves to support the pipeline surface above an underlying surface in the trench. The surface of the pipeline-receiving section will have a curvature of no more than 90°.

When the first pipeline-receiving section is joined to the pipeline-receiving section, the pipeline-receiving surfaces thereof will have a curvature of no more than 180°. As such, the pipe of the pipeline can be placed therein. As such, these surfaces will serve as a cradle for the receipt of the pipeline. The first pipeline-receiving section has a flat surface generally facing a flat surface of the second pipeline-receiving section. As such, the fastener can be joined to these flat surfaces so as to secure these sections together. The surfaces can serve as a guide for the lowering of the pipe when the first section is separated from the second section.

The fastener in the present invention can be a pin that is positioned in the first and second pipeline-receiving sections so as to secure the flat surfaces thereof together. A line can be affixed to the pin. The line extends outwardly therefrom. The line allows a user located on the earth adjacent to the trench to pull the pin from the first and second pipeline-receiving sections so as to allow the sections to separate by the action of gravity caused by the weight of the pipeline on the pipeline-receiving surfaces of these sections. The first and second pipeline-receiving sections can be formed of a polymeric material.

The present invention is also a method of installing a pipeline into a trench. The method of the present invention includes the steps of: (1) forming a pipeline support having a first section and a second section; (2) placing a pipe of the pipeline upon the first and second sections of the pipeline support; and (3) separating the first section from the second section such that the pipe lowers therebetween.

In the method of the present invention, the first and second sections are joined together with a pin. Each of the first and second sections has a pipeline-receiving surface thereon. The pipe is placed onto these pipeline-receiving surfaces of the first and second sections.

The step of separating includes removing a pin that joins the first section to the second section. The removal of the pin operates so as to cause gravity to separate the first section from the second section. The pin is removed by pulling on a line that is attached to the pin. When the pin is removed, the sections will separate and the pipe of the pipeline will move toward the earth.

The method of the present invention further includes the step of forming a trench and placing the pipeline support onto a bottom surface of the trench. In particular, a first pipeline support and a second pipeline support can be placed within the trench. A first pipe is placed on the first pipeline support and second pipe is placed on the second pipeline support such that the pipes are in end-to-end relationship. In this configuration, suitable welding can occur at the ends of the pipes. Subsequent to welding, the pins can be removed from the pipeline support so as to allow the joined first and second pipes to be lowered within the trench.

DETAILED DESCRIPTION OF THE INVENTION

Figure 1:
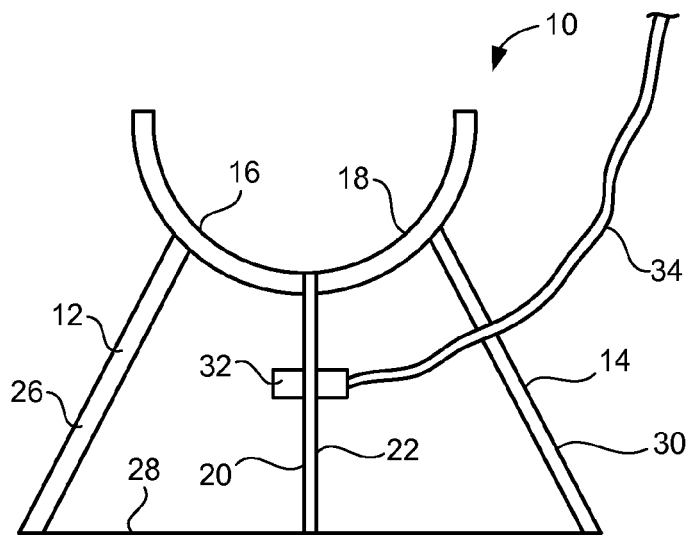
FIG. 1 is an end view showing the pipeline support apparatus of the preferred embodiment of the present invention.

Referring to FIG. 1, there is shown the pipeline support apparatus 10 in accordance with the teachings of the present invention. The pipeline support apparatus 10 includes a first pipeline-receiving section 12 and a pipeline-receiving section 14. The first pipeline-receiving section 12 includes a surface 16 formed at an upper end thereof. The pipeline-receiving section 14 has a surface 18 formed at an upper end thereof. The surfaces 16 and 18 provide an area suitable for receiving of a pipe of a pipeline therein. In particular, the pipeline-receiving surfaces 16 and 18 have a curvature generally conforming to a curvature of the pipe of the pipeline.

As can be seen in FIG. 1, the surface 16 of the pipeline-receiving section 12 has a curvature extending for approximately 90°. The surface 18 of the second pipeline-receiving section 14 also has a curvature of approximately 90°. As such, these surfaces will coincide so as to provide a curvature of no more than 180°.

The first pipeline-receiving section 12 includes a generally flat surface 20 formed adjacent the inner end of the surface 16. Similarly, the second pipeline-receiving section 14 has a flat surface 22 formed adjacent to the lower end of the curved surface 18. These flat surfaces 20 and 22 face each other. A strut 26 will extend from the surface 16 downwardly toward a base 28. Similarly, another strut 30 will extend angularly outwardly from the surface 18 toward the base 28. The flat surfaces 20 and 22 extend in generally transverse relationship to the base 28.

Importantly, in FIG. 1, it can be seen that there is a pin 32 that is attached through an opening formed in each of the flat surfaces 20 and 22. A line 34 is affixed to one end of the pin 32 and extends outwardly therefrom. The pin 32 is received within the pipeline section 12 and the pipeline section 14 so as to join the pipeline-receiving sections 12 and 14 together so that the surfaces 16 and 18 are strongly secured together. In this arrangement, it is not possible for the surfaces 16 and 18 to deflect in any way when a pipe is received therein. Ultimately, the pin 32 is removable from the pipeline-receiving sections 12 and 14 when a pulling force is applied to the line 34.

Figure 2:
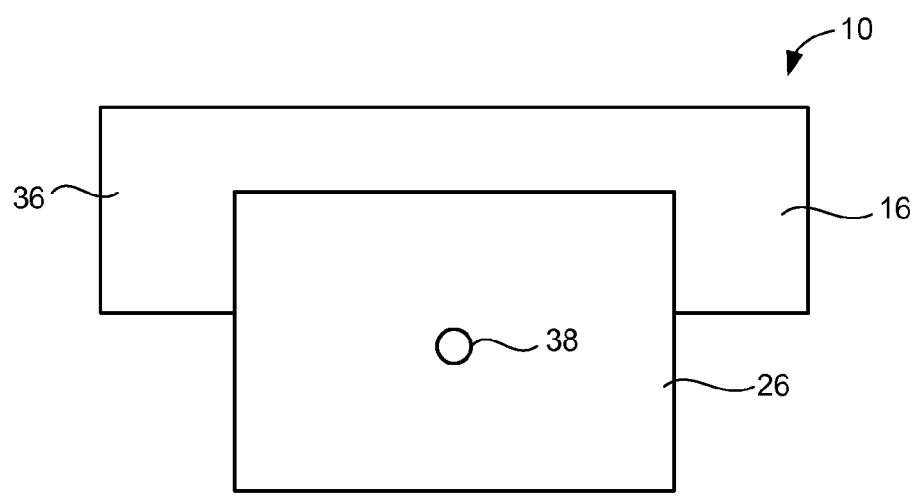
FIG. 2 is a side view of the pipeline support apparatus of the present invention.

FIG. 2 is a side view of the pipeline support apparatus 10 of the present invention. As can be seen, a wall 36 defines the outer surface of the pipeline-receiving section 16. The strut 26 extends downwardly in one section from the curved portion 36. Within the concept of the present invention, the strut 26 can be in the nature of a single strut or it can be in the nature of several struts that extend so as to provide structural integrity to the curved surface 16. A suitable opening 38 can be provided on the strut so as to allow the cable 34 to extend therethrough for the actuation of the pin 32.

Figure 3:
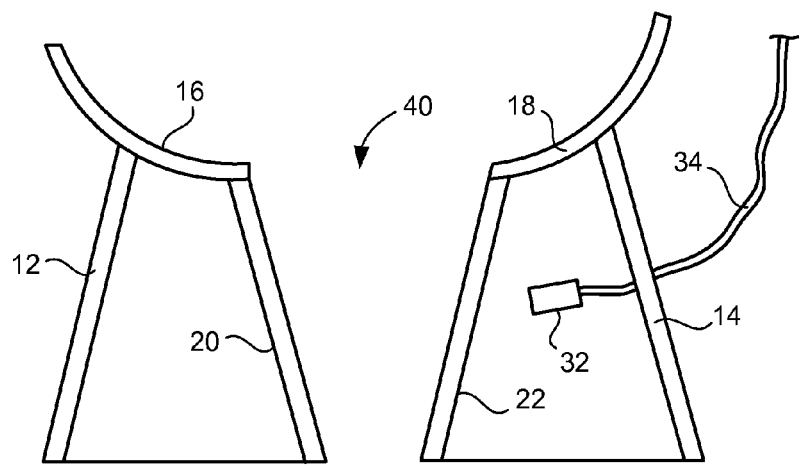
FIG. 3 is am end view showing the separation of the first pipeline support from the second pipeline support in accordance with the present invention.

FIG. 3 shows the relationship of the first pipeline-receiving section 12 in relation to the pipeline-receiving section 14 when the pin 32 is removed from the flat surfaces 20 and 22. When the pin 32 is removed by a pulling force applied to the line 34, the flat surfaces 20 and 22 will separate from each other. Simultaneously, the curved surfaces 16 and 18 will separate from each other. As a result, there is an interior area 40 through which a pipeline can pass so as to be directed toward the bottom of the surfaces 20 and 22. The flat surface 20 and 22 can serve as a guide, during this operation, such that the pipeline can be centered properly within the trench.

Figure 4:
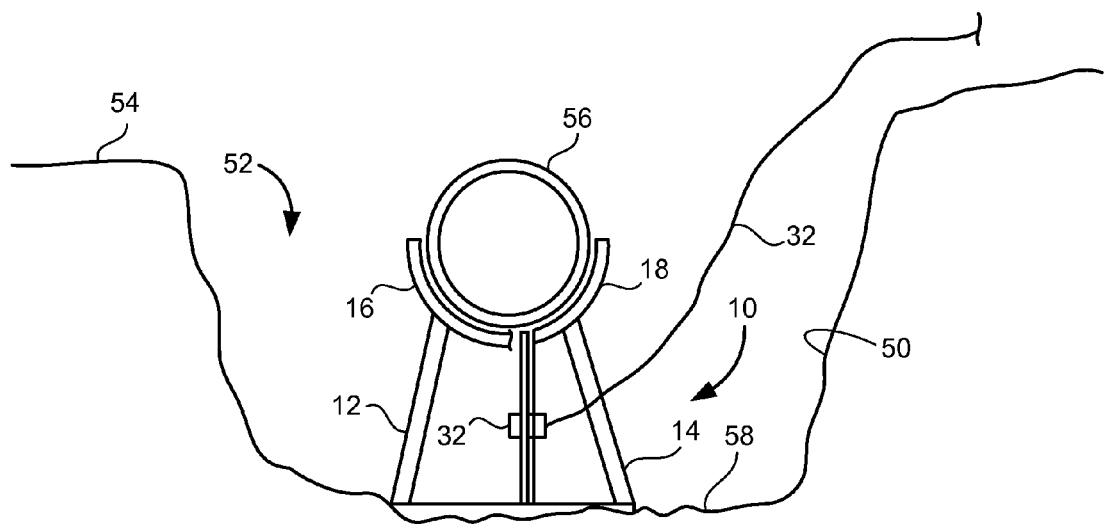
FIG. 4 shows an initial step in the installation of a pipeline within a trench.

FIG. 4 shows the pipeline support apparatus 10 as positioned within a trench 50. Trench 50 is in the nature of an excavation 52 formed in the earth 54. A pipeline 56 is illustrated as placed upon the curved surfaces 16 and 18 of the pipeline support apparatus 10. In this configuration, the pipeline 56 is positioned a desired distance above the bottom 58 of the trench 50. The side walls of the trench 50 provide a suitable area whereby suitable welding operations can be carried out on the pipeline 56. The pin 32 secures the pipeline-receiving sections 12 and 14 together. The line 34 extends from the pin 32 to a location at the surface of the earth 54. As a result, a person standing on the surface of the earth 54 can pull on the line 32 so as to cause the separation of the pipeline-receiving sections 12 and 14 such that the pipeline 56 move downwardly toward the earth.

Figure 5:
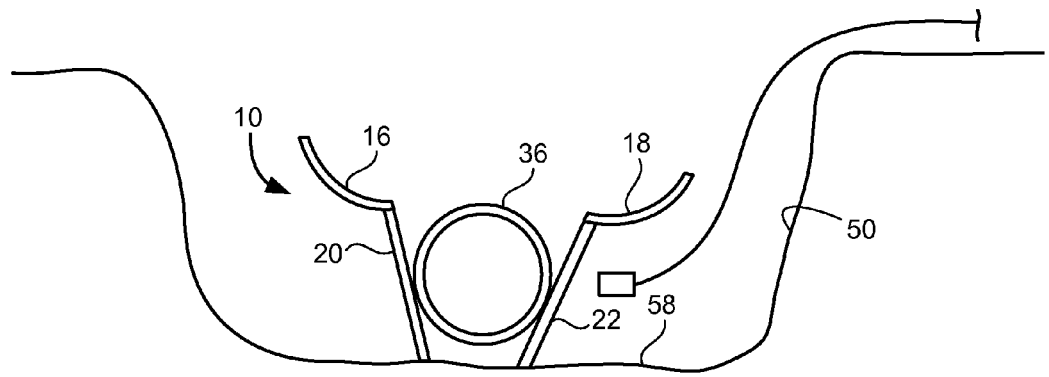
FIG. 5 illustrates a subsequent step in the installation of a pipeline within the trench using the pipeline support apparatus of the present invention.

FIG. 5 shows the operation whereby the pipeline 56 is directed toward the bottom 58 of the trench 50. As can be seen in FIG. 5, the pipeline 56 has drifted down so as to be in a location between the flat surfaces 20 and 22 of the pipeline support apparatus 10. The pipe 36 has been removed from the flat surfaces 16 and 18. Ultimately, once the pipeline 56 reaches the bottom 58 of the trench 50, backfilling operations can then be carried out. Since each of the pipeline-receiving sections 12 and 14 are formed of an inexpensive polymeric material, these sections can be retained within the trench 50 during the backfilling operation. As such, the present invention avoids the need so as to remove the pipeline support apparatus 10 once it is installed and used.

Figure 6:
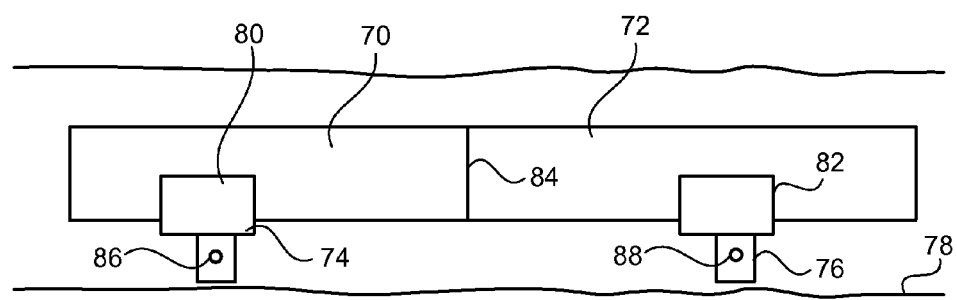
FIG. 6 is a side elevational view showing the utilization of a first pipeline-support apparatus and a second pipeline-support apparatus for the joining of a first pipe and a second pipe together within a trench.

FIG. 6 shows how a first pipe 70 and a second pipe 72 are positioned upon a first pipeline support apparatus 74 and a second pipeline support apparatus 76 within a trench 78. The cradle 80 of the first pipeline support apparatus 74 receives the pipe 70 therein. The cradle 82 of the second pipeline support apparatus 76 receives the pipe 72 therein. The pipes 70 and 72 are placed together so as to be in end-to-end relationship. As such, welding can occur at the junction 84 of the pipes 70 and 72 so that the full pipeline can be installed within the trench.

In FIG. 6, it can be seen that once the pipes 70 and 72 of the pipeline are properly installed together, the pin 86 of the pipeline support apparatus 74 and the pin 88 of the pipeline support apparatus 82 can be removed so that the sides open with respect to each other so as to allow the pipes 70 and 72 to move downwardly toward the bottom 78 of the trench. After this occurs, a complete backfilling of the trench can then occur.

The foregoing disclosure and description of the invention is illustrative and explanatory thereof. Various changes in the details of the illustrated apparatus and described method within the scope of the present claims can be made without departing from the true spirit of the invention. The present invention should only be limited by the following claims and their legal equivalents.

I claim:

1. A support apparatus for a pipeline, the support apparatus comprising:
   a first pipeline-receiving section having a curved surface with a concavity facing upwardly;
   a second pipeline-receiving section having another curved surface with another concavity facing upwardly, said first and second pipeline receiving sections defining an unobstructed opening at an upper end thereof in which the unobstructed opening has a width dimension that is greater than a diameter of the pipeline;
   a first support affixed to said first pipeline-receiving section and extending downwardly therefrom;
   a second support affixed to said second pipeline-receiving section and extending downwardly therefrom; and
   a fastener removably affixed to said first support and said second support so as to be in a pipeline-supporting position, said fastener removable from said first and second supports so as to allow said first and second pipeline receiving sections to separate from each other by action of gravity upon the pipeline supported by said first and second pipeline-receiving sections, said curved surface of said first pipeline-receiving section having a curvature generally corresponding to a curvature of an outer wall of the pipeline said first support extending downwardly so as to allow the curved surface of said first pipeline-receiving section to be positioned at a desired location above a bottom of a trench, said on the curved surface of said second pipeline-receiving section having a curvature corresponding to a curvature of the outer wall of the pipeline, said second support extending downwardly so as to allow the curved surface of said second pipeline-receiving section to be positioned at a desired location above the bottom of the trench, the curvature of each of the curved surfaces of said first and second pipeline-receiving sections being no more than 90°.

2. The support apparatus of claim 1, said first support being a flat surface extending radially away from said first pipeline-receiving section, said second support being a flat surface extending radially away from second pipeline-receiving section, the flat surfaces being positioned adjacent to one another when in the pipeline-supporting position.

3. The support apparatus of claim 2, the flat surfaces extending in a generally vertical orientation.

4. The support apparatus of claim 2, said fastener being removably affixed to at least one of the flat surfaces.

5. The support apparatus of claim 4, the flat surfaces moving angularly away from each other when said fastener is removed from the first and second supports.

6. The support apparatus of claim 1, said fastener being a pin positioned in said first and second supports.

7. The support apparatus of claim 6, said pin having a line affixed to said pin, said line extending away from said first and second pipeline-receiving sections.

8. The support apparatus of claim 1, said first and second pipeline-receiving sections being formed of a polymeric material.

* * * * *